(12) United States Patent
Martin et al.

(10) Patent No.: US 8,616,814 B2
(45) Date of Patent: Dec. 31, 2013

(54) E-HOOK

(76) Inventors: Edward Martin, Lawrenceville, GA (US); Carl Martin, Hapeville, GA (US); Charles Martin, Kennesaw, GA (US)

( * ) Notice: Subject to any disclaimer, the term of this patent is extended or adjusted under 35 U.S.C. 154(b) by 0 days.

(21) Appl. No.: 13/217,201

(22) Filed: Aug. 24, 2011

(65) Prior Publication Data
US 2012/0121357 A1 May 17, 2012

Related U.S. Application Data

(63) Continuation-in-part of application No. 29/351,620, filed on Jan. 16, 2010, now abandoned.

(51) Int. Cl.
*B60P 7/08* (2006.01)
(52) U.S. Cl.
USPC .......................................... 410/120; 410/32
(58) Field of Classification Search
USPC .............. 410/32, 34, 50, 120, 144, 150, 89; 248/65, 112, 175, 220.31, 220.41, 249, 248/302, 317, 505, 221.11, 222.11, 323, 248/304, 339, 340, 225.21, 73; 211/60.1, 211/85.31, 113, 85.29, 103, 189, 190, 193, 211/187, 7, 208, 70.6, 87.01

See application file for complete search history.

(56) References Cited

U.S. PATENT DOCUMENTS

| | | | |
|---|---|---|---|
| 5,516,245 A * | 5/1996 | Cassidy | 410/101 |
| 6,948,895 B2 * | 9/2005 | Buff | 410/104 |
| 2009/0057498 A1 * | 3/2009 | Oh et al. | |

* cited by examiner

*Primary Examiner* — Stephen Gordon

(57) ABSTRACT

A trailer wall hook is provided as a single unit that includes a U-shaped hook with a rounded or square base. The U-shaped hook includes an open eye-loop and j-hook support brackets. The open eye-loop is attached to the top front of the U-shaped hook and two smaller j-hooks are attached upside down on the rear of the U-shaped hook. The j-hooks provide for mounting the trailer wall hook on a cargo control or tie-down system on the inside wall of a trailer. The trailer wall hook provides for loading and supporting linear shaped or irregular shaped freight onto the wall.

18 Claims, 2 Drawing Sheets

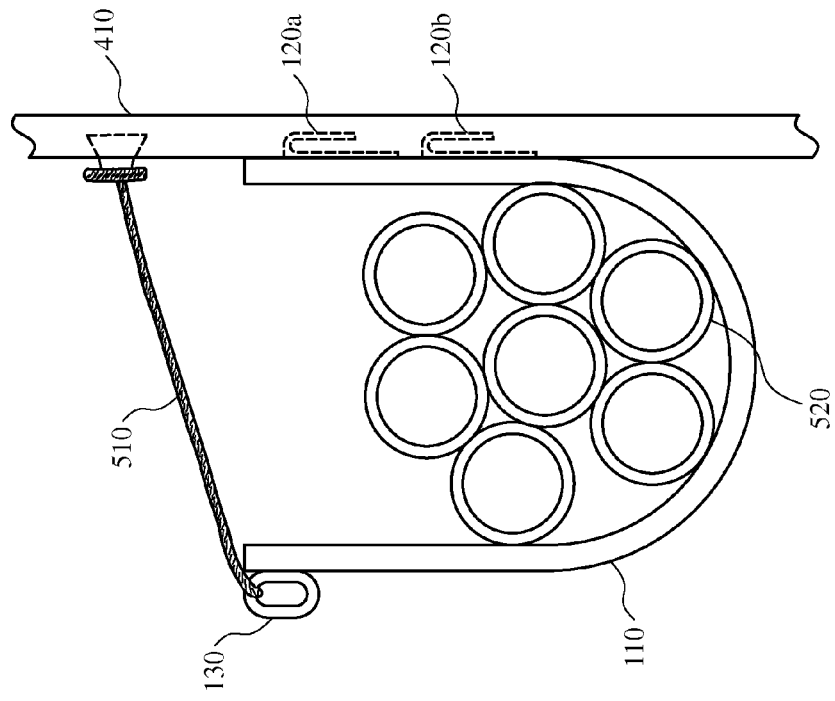
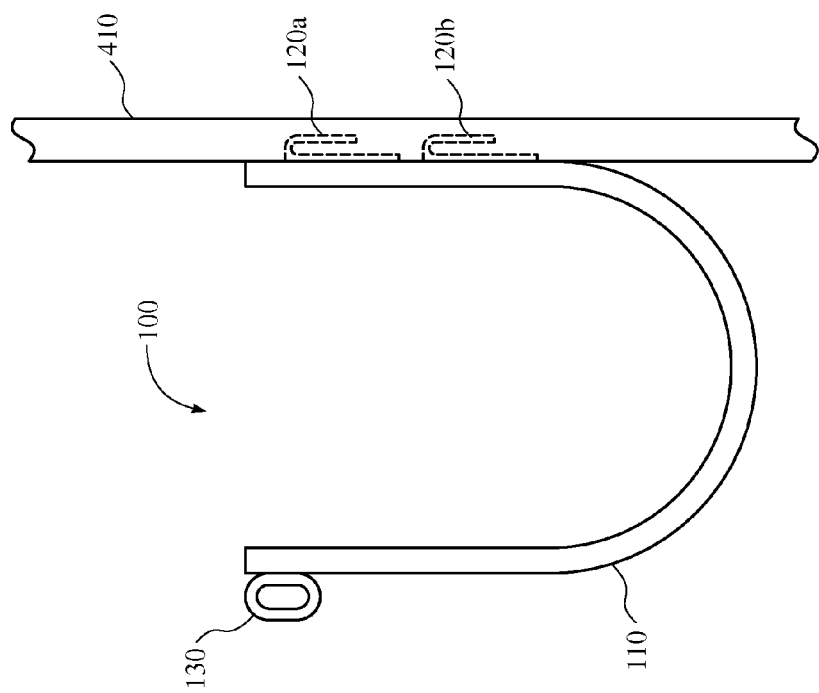

E-HOOK

CROSS-REFERENCE TO RELATED APPLICATIONS

This application is a continuation-in-part of prior application Ser. No. 29/351,620 filed Jan. 16, 2010, now abandoned, which is incorporated herein by reference as if set forth herein in its entirety.

BACKGROUND

The present invention is an improvement in hooks and particularly to a hook adapted for use in connection with the loading of cargo or freight. The present invention provides a hook that allows freight to be hung directly on the wall of a trailer for semi-trucks.

BRIEF SUMMARY

A hook for loading freight directly onto a trailer wall of a semi-truck is provided. The trailer wall hook is an improvement in hook functionality for loading freight directly onto a trailer wall.

A primary objective of the trailer wall hook is to allow a user the unique ability to load three (3) sides of a trailer rather than one (1) side. This provides for utilizing both side walls of a semi-truck trailer as well as the front wall.

Another objective of the trailer wall hook is to reduce the threat of potential damage to loose, odd-shaped, or fragile freight in the trailer.

Yet another objective of the trailer wall hook is to increase the available yet unrealized loading space inside the trailer of a semi-truck. There are three conventional methods for loading freight onto a trailer. A first method for loading, perhaps the only method that applies to all freight up until the present, has been to place the freight on the floor of the trailer. A second method for loading is known as double-stacking. Double-stacking requires placing or stacking the freight on top of other floor loaded freight. A third method for loading freight is decking. Decking is the placement of the freight on top of platforms.

The trailer wall hook design and functionality provides or creates space savings, provides additional loading surfaces, and reduces damage to the freight or cargo.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

The above-mentioned features will become more clearly understood from the following detailed description read together with the drawings in which:

FIG. 4 is an illustration of the trailer wall hook mounted on a trailer wall; and FIG. 5 is an illustration of the trailer wall hook mounted on a trailer wall and in use for storage of cargo.

DETAILED DESCRIPTION

The present invention is an improvement in hooks and particularly to a hook adapted for use in connection with the loading of cargo or freight. The present invention provides a hook that allows freight to be hung directly on the wall of a trailer for semi-trucks.

A hook for loading freight directly onto a trailer wall of a semi-truck is provided. The trailer wall hook is an improvement in hook functionality for loading freight directly onto a trailer wall.

A primary objective of the trailer wall hook is to allow a user the unique ability to load three (3) sides of a trailer rather than one (1) side. This provides for utilizing both side walls of a semi-truck trailer as well as the front wall.

Another objective of the trailer wall hook is to reduce the threat of potential damage to loose, odd-shaped, or fragile freight in the trailer.

Yet another objective of the trailer wall hook is to increase the available yet unrealized loading space inside the trailer of a semi-truck. There are three conventional methods for loading freight onto a trailer. A first method for loading, perhaps the only method that applies to all freight up until the present, has been to place the freight on the floor of the trailer. A second method for loading is known as double-stacking. Double-stacking requires placing or stacking the freight on top of other floor loaded freight. A third method for loading freight is decking. Decking is the placement of the freight on top of platforms.

The trailer wall hook design and functionality provides or creates space savings, provides additional loading surfaces, and reduces damage to the freight or cargo.

Figure 1:
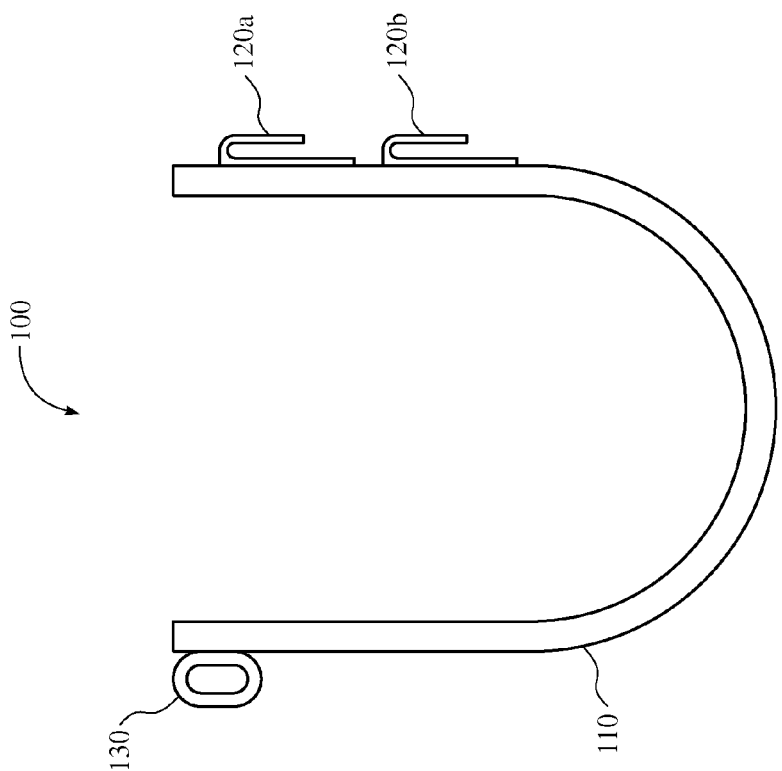
FIG. 1 is a side view of the trailer wall hook illustrating an open eye loop at the front and a j-hook at the rear.

FIG. 1 is a side view of the trailer wall hook 100 illustrating an open eye loop 130 at the front and smaller support brackets 120 at the rear of the trailer wall hook 100. The trailer wall hook 100 includes a hook frame 110, a pair of support brackets 120, and an open eye loop 130. The trailer wall hook 100 is formed as a single unit from a hook frame 110, the support brackets 120, and the open eye loop 130. The single unit trailer wall hook 100 is made from metal, steel, or hardened molded injected plastic, for example. The support brackets 120 are also known as j-hooks. The illustrated embodiment includes two support brackets 120a, 120b.

Figure 2:
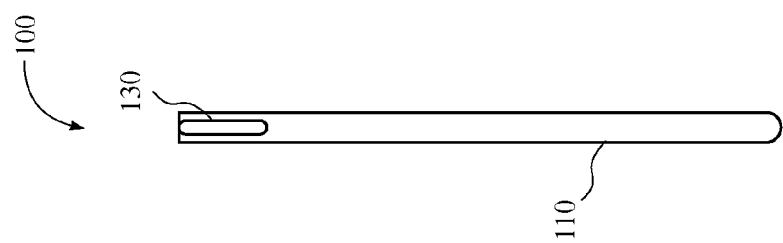
FIG. 2 is a rear view of the trailer wall hook illustrating the j-hook portion.

FIG. 2 is a rear view of the trailer wall hook 100 illustrating the support brackets 120. The support brackets 120 on the rear of the trailer wall hook 100 are utilized to mount the trailer wall hook 100 into the slotted rails on the inside wall of a semi-truck's trailer.

The hook frame 110 is a large open U-shaped hook with support brackets 120 attached on the rear side to provide for mounting the trailer wall hook 100 onto a cargo control or tie down system such as an E-Track system, for example. The support brackets 120 are slid into place and then dropped down to lock the trailer wall hook 100 into position. The weight of the trailer wall hook 100 along with the weight of the cargo or freight keeps the trailer wall hook 100 in position.

Figure 3:
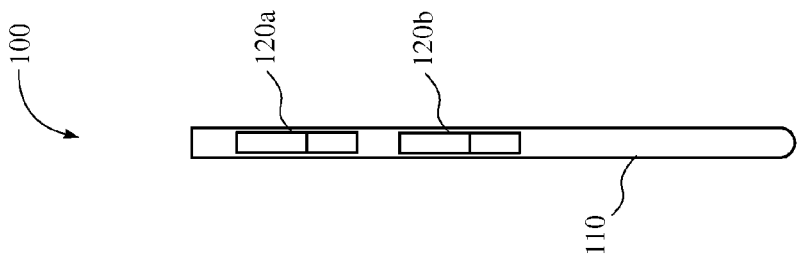
FIG. 3 is a front view of the trailer wall hook illustrating the front of the open eye loop.

FIG. 3 is a front view of the trailer wall hook 100 illustrating the front of the open eye loop 130. The trailer wall hook 100 includes an open eye loop 130. In one embodiment, the open eye loop 130 provides for a rope tie-off. Such an embodiment provides additional support for the trailer wall hook 100. Additionally, such an embodiment provides for containing or corralling freight within the trailer wall hook 100.

FIG. 4 is an illustration of the trailer wall hook 100 mounted on a trailer wall 410. The support brackets 120 on the rear of the trailer wall hook 100 are utilized to mount the trailer wall hook 100 into the slotted rails on the inside wall 410 of the semi-truck's trailer.

FIG. 5 is an illustration of the trailer wall hook 100 mounted on the inside wall 410 of a truck trailer and in use for storage of cargo. A rope 510 or other tie-down device is used to secure the cargo within the trailer wall hook 100.

The trailer wall hook 100 is used in single units or in pairs to provide or create additional loading space in trailers with a cargo control or tie down system (such as an E-Track system, for example). The trailer wall hook 100 provides for moving loose, odd-shaped, and irregular shaped freight onto a trailer wall. This provides more loading space on a trailer floor.

The trailer wall hook 100 is also used to provide for leaning or angling linear freight against the truck trailer wall, either upwards or downwards.

In another embodiment, the trailer wall hook is mounted in pairs or in multiple units on a trailer wall to load freight in stacks that are one above the other, as in shelves.

It should be apparent that the trailer wall hook 100 provides multiple functionality for substantially reducing freight damage during transit While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A hook for hanging to a cargo control track system on a wall of a trailer, the hook comprising:
    a single unit including one of metal, steel, or hardened molded injected plastic, the single unit further comprising:
        a U-shaped frame, said frame having a first cylindrical stem and a second cylindrical stem extending distally from each side of a semicircular arc portion to form a U-opening;
        a plurality of support brackets near an end of said first cylindrical stem and distal from said arc portion, said plurality of support brackets situated lengthwise along said first cylindrical stem and lengthwise relative to each other support bracket among said plurality of support brackets, each support bracket having a bracket opening oriented opposite of said U-opening, said support brackets spaced lengthwise to fit the cargo control track system so that said U-shaped frame is oriented vertically for containing generally horizontal cargo; and
        an eye loop near an end of said second cylindrical stem and distal from said arc portion, said eye loop substantially opposite said plurality of support brackets,
    wherein the hook is attachable via said plurality of support brackets to the cargo control track system for supporting and containing cargo.

2. The hook of claim 1, wherein said support brackets are spaced to fit an E type cargo control track system.

3. The hook of claim 1, wherein each support bracket is a J-hook.

4. The hook of claim 1, further comprising at least two support brackets.

5. The hook of claim 1, wherein said hook, when attached to a cargo control track system, forms a load opening for load support and containment of cargo within confines of said load opening.

6. A hook for hanging to a cargo control track system on a wall of a trailer, the hook comprising:
    a single unit including one of metal, steel, or hardened molded injected plastic, the single unit further comprising:
        a U-shaped frame, said frame having a first cylindrical stem and a second cylindrical stem extending distally from each side of a semicircular arc portion to form a U-opening;
        a plurality of support brackets near an end of said first cylindrical stem and distal from said arc portion, said plurality of support brackets situated lengthwise along said first cylindrical stem and lengthwise relative to each other support bracket among said plurality of support brackets, each support bracket having a bracket opening oriented opposite of said U-opening, and said support brackets spaced to fit the cargo control track system; and
        an eye loop near an end of said second cylindrical stem and distal from said arc portion, said eye loop substantially opposite said plurality of support brackets,
    wherein said frame is attachable via said plurality of support brackets to the cargo control track system.

7. The hook of claim 6, wherein said support brackets are spaced to fit an E type cargo control track system.

8. The hook of claim 6, wherein each support bracket is a J-hook.

9. The hook of claim 6, further comprising at least two support brackets.

10. The hook of claim 6, wherein said hook, when attached to a cargo control track system, forms a load opening for containment of cargo within confines of said load opening.

11. A hook for hanging to a cargo control track system on a wall of a trailer, the hook comprising:
    a single unit including one of metal, steel, or hardened molded injected plastic, the single unit further comprising:
        a U-shaped frame, said frame having a first stem and a second stem extending distally from each side of a semicircular arc portion to form a U-opening;
        a plurality of support brackets near an end of said first stem and distal from said arc portion, wherein each support bracket is a J-hook having a bracket opening oriented opposite of said U-opening, said support brackets spaced to fit the cargo control track system so that said U-shaped frame is oriented vertically for containing generally horizontal cargo; and
        an eye loop near an end of said second stem and distal from said arc portion, said eye loop substantially opposite said plurality of support brackets,
    wherein the hook is attachable via said plurality of support brackets to the cargo control track system for supporting and containing cargo.

12. The hook of claim 11, wherein said support brackets are spaced to fit an E type cargo control track system.

13. The hook of claim 11, further comprising at least two support brackets.

14. The hook of claim 11, wherein said hook, when attached to a cargo control track system, forms a load opening for load support and containment of cargo within confines of said load opening.

15. A hook for hanging to a cargo control track system on a wall of a trailer, the hook comprising:
- a single unit including one of metal, steel, or hardened molded injected plastic, the single unit further comprising:
  - a U-shaped frame, said frame having a first stem and a second stem extending distally from each side of a semicircular arc portion to form a U-opening;
  - a plurality of support brackets near an end of said first stem and distal from said arc portion, wherein each support bracket is a J-hook having a bracket opening oriented opposite of said U-opening, and said support brackets spaced to fit the cargo control track system; and
  - an eye loop near an end of said second stem and distal from said arc portion, said eye loop substantially opposite said plurality of support brackets,
- wherein said frame is attachable via said plurality of support brackets to the cargo control track system.

16. The hook of claim 15, wherein said support brackets are spaced to fit an E type cargo control track system.

17. The hook of claim 15, further comprising at least two support brackets.

18. The hook of claim 15, wherein said hook, when attached to a cargo control track system, forms a load opening for containment of cargo within confines of said load opening.

* * * * *